United States Patent [19]

Trinkwalder, Jr.

[11] 4,360,038
[45] Nov. 23, 1982

[54] MAGNETICALLY-OPERATED VALVE

[75] Inventor: Joseph C. Trinkwalder, Jr., North Tonawanda, N.Y.

[73] Assignee: Sherwood Selpac Corporation, Lockport, N.Y.

[21] Appl. No.: 178,692

[22] Filed: Aug. 18, 1980

[51] Int. Cl.³ .................. F16K 21/18; F16K 33/00
[52] U.S. Cl. .................... 137/390; 137/429; 137/443; 141/198; 141/DIG. 1; 222/67; 251/65
[58] Field of Search .............. 137/397, 399, 398, 429, 137/390, 443, 442; 141/198, DIG. 1; 222/67, 68; 251/65

[56] References Cited

U.S. PATENT DOCUMENTS

| | | | |
|---|---|---|---|
| 932,153 | 8/1909 | Martin | 137/390 |
| 1,390,446 | 9/1921 | Jerdone, Jr. | 137/390 |
| 2,609,669 | 9/1952 | Eddy | 251/65 |
| 3,202,174 | 8/1965 | Rudelick | 251/65 |
| 3,233,625 | 2/1966 | Pase | 251/65 |
| 3,741,239 | 6/1973 | Riddiford | 251/65 |
| 3,822,933 | 7/1974 | Johnson | 251/65 |

FOREIGN PATENT DOCUMENTS

| | | | |
|---|---|---|---|
| 813260 | 5/1959 | United Kingdom | 251/65 |
| 2046523 | 11/1980 | United Kingdom | 251/65 |

Primary Examiner—George L. Walton
Attorney, Agent, or Firm—Sommer & Sommer

[57] ABSTRACT

A magnetically-operated valve has a body provided with a passageway therethrough. A piston is mounted on the body for sliding movement toward and away from a valve seat. The piston has a magnetic pole at one end. A magnet is mounted on the body for movement between a first position, at which the piston will be held in a flow-permitting position, and a second position, at which the piston will sealingly engage the seat to terminate such flow. An override mechanism may be operated to displace the piston against the repulsive forces between like poles.

6 Claims, 4 Drawing Figures

MAGNETICALLY-OPERATED VALVE

BACKGROUND OF THE INVENTION

1. Field of the Invention

The present invention relates generally to the field of valves, and more particularly to an improved valve which may be magnetically moved between open and closed conditions in response to a variation in a sensed parameter.

2. Description of the Prior Art

One of the more common valves is the gate valve, which has been used to meter flow from a fuel storage cylinder. In such use, these valves have been called "cylinder" valves. These are encountered on a variety of propane-fueled domestic appliances, such as gas grills and the like. However, it is somewhat difficult for a person to gauge the amount of fuel remaining in the storage tank.

It has been proposed to provide visual indicators of the level of remaining fuel. However, these may be ignored or overlooked.

SUMMARY OF THE INVENTION

The present invention provides an improved valve, which may be operated magnetically in response to variance in a sensed parameter.

The improved valve broadly includes a body having a passageway for permitting a flow of fluid therethrough and having a seat surrounding the passageway; an element mounted in the body for movement toward and away from the seat, the element having a portion thereof arranged to sealingly engage the seat when said element has selectively moved toward the seat and having a magnetic pole; a magnet mounted in the body for movement between a first position at which the element will be held in a flow-permitting position, and a second position at which the element will be held in a flow-stopping position; and an actuator arranged to move the magnet in response to a variation in a sensed parameter.

Accordingly, one object of the present invention is to provide an improved valve.

Another object is to provide an improved valve wherein a valve element may be moved magnetically between open and closed positions relative to a seat.

Another object is to provide an improved valve wherein the flow metering orifice between a movable element and a seat is varied in response to a variance in a sensed parameter.

These and other objects and advantages will become apparent from the foregoing and ongoing specification, the drawings, and the appended claims.

DESCRIPTION OF THE PREFERRED EMBODIMENTS

Figure 2:
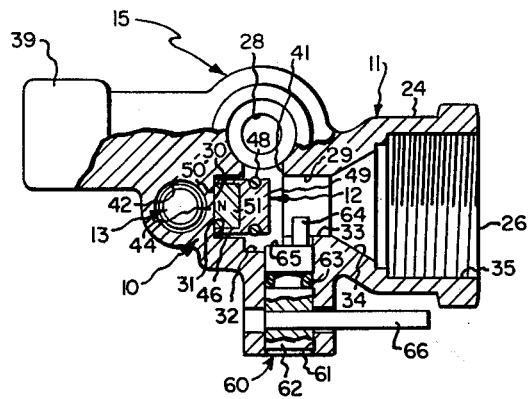
FIG. 2 is a fragmentary horizontal sectional view thereof, taken generally on line 2—2 of FIG. 1, and showing the override mechanism in an inoperative position.

At the outset, it should be clearly understood that like reference numerals are intended to identify the same structure consistently throughout the several drawing figures, as such structure may be further described or explained by the entire written specification, of which this detailed description is an integral part.

Figure 1:
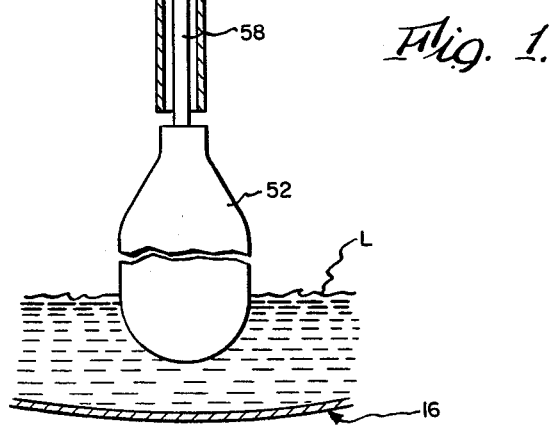
FIG. 1 is a fragmentary vertical sectional view of a gate valve incorporating the improved magnetically-operated valve.

Referring now to the drawings, and more particularly to FIG. 1 thereof, the invention provides an improved magnetically-operated valve, of which the presently preferred embodiment is generally indicated at 10, which broadly includes a body 11, a movable valve element 12, a movable magnet 13, and an actuator 14 arranged to move the magnet in response to variation in a sensed parameter.

Persons skilled in this art will immediately appreciate that the improved valve 10 is shown as being incorporated in an otherwise conventional gate or "cylinder" valve, generally indicated at 15, mounted on a storage tank 16 containing a suitable LPG fuel, such as propane. While sharing a common body, the improved valve 10 operates independently of the gate valve, which continues to function in the usual manner. In the accompanying drawings, the preferred embodiment has been sectioned appropriately to focus on the improved valve. Many individual details of the gate valve are not relevant to the structure and operation of the present improvement. Hence, such details are shown in elevation whenever possible.

The tank 16 has an enclosing wall 18, and is provided with an upper opening 19. The tank is shown as containing a level (L) of liquid propane, above which is gaseous propane. An adapter 20 is mounted in the tank opening, and has its outer margin permanently secured thereto by an annular weldment 21. The adapter is provided with a slightly tapered internally-threaded throughbore 22 to accommodate mounting of the valve body thereon.

The body 11 is shown as being a specially-configured member having, in pertinent part, a somewhat inverted L-shaped vertical section, which includes a vertical leg 23 and a horizontal leg 24 extending rightwardly therefrom. The body has an internal passageway communicating its lower horizontal inlet end 25 with its rightward vertical outlet end 26. Specifically, this passageway includes a vertical portion 28 (FIG. 2) arranged in the body vertical leg 23, and a horizontal portion 29 continuing rightwardly therefrom through body horizontal leg 24 and terminating at outlet end 26. The passageway horizontal portion 29 is bounded by (from left to right): a rightwardly-facing circular vertical end face 30, a cylindrical portion 31, an annular groove 32 extending radially into the body and communicating with the passageway vertical portion 29 (FIG. 2), a cylindrical portion 33, a rightwardly-divergent frusto-conical portion 34, and an internally-threaded portion 35 continuing rightwardly to join the annular vertical right end face 26 of the body.

The lower marginal end of body vertical leg 23 is externally-threaded, as indicated at 38, so as to be matingly received in the adapter. Although not particularly relevant to the present improvement, the body has a tubular collar 39 extending leftwardly therefrom to accommodate a pressure relief valve (not shown), and an uppermost handwheel 40 which may be grasped and selectively rotated to move the gate valve's poppet (not shown) relative to its seat (not shown). The poppet and seat of the gate valve are arranged in the passageway vertical portion, but are not material to the present improvement.

The body is shown as including a leftwardly-facing annular seat 41, surrounding the upper passageway and formed at the intersection of the groove 32 and cylindrical surface 33. The body is shown as further provided with a deep cylindrical hole 42, which extends vertically up into the body from its annular horizontal lower end face 25. This hole 42 is isolated from the upper passageway end face 30 by an intermediate wall 44, which should minimally be formed of a magnetically permeable material. In the preferred embodiment, the entire body is formed of such a magnetically permeable material, such as brass. The upper terminal end 45 of hole 42 is positioned vertically above the upper passageway for a purpose hereinafter apparent.

The valve element 12 is in the form of a free sliding piston, and has a cylindrical outer surface 46 provided with an inwardly-extending radial groove designed to accommodate encircling O-Ring 48, and a circular vertical right end face 49. A cylindrical recess extends rightwardly into the piston from its annular vertical left end face 50, to receive a permanent magnet 51. In the illustrated embodiment, the North pole (N) of magnet 51 is flush with piston left face 50.

Permanent magnet 13 is movably mounted in body hole 42. This magnet is shown as having an upper North pole (N), and a lower South pole (S).

The actuator 14 is operatively arranged to move magnet 13 in response to variation in a sensed parameter. In the illustrated embodiment, such parameter is the level of liquid propane, which is sensed by a float 52. A connecting rod 53 has its lower end mounted on the float, and has a carriage 54 at its upper end to receive and hold magnet 13. Movement of rod 53 is guided by a tube 55, having an upper end portion press-fitted into body hole 42. The tube's upper end portion 56 is bent inwardly to more closely surround the rod. The rod is provided with an enlarged portion 58 above its connection with float 52 to reduce the radial clearance with the tube. Because liquid propane has a relatively low density, a compression spring 59 is arranged to act between the tube upper end portion 56 and the carriage 54 holding magnet 13.

Figure 3:
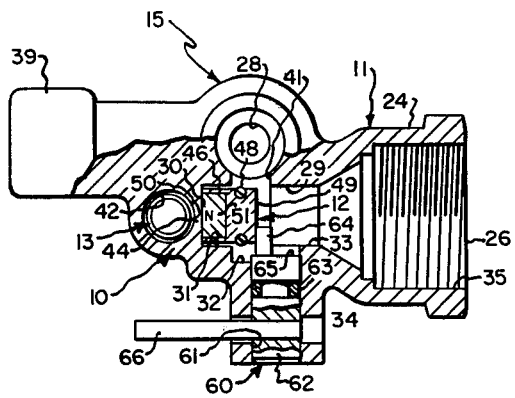
FIG. 3 is a view similar to that of FIG. 2, but showing the override mechanism as having been operated to displace the element away from its seat.
Figure 4:
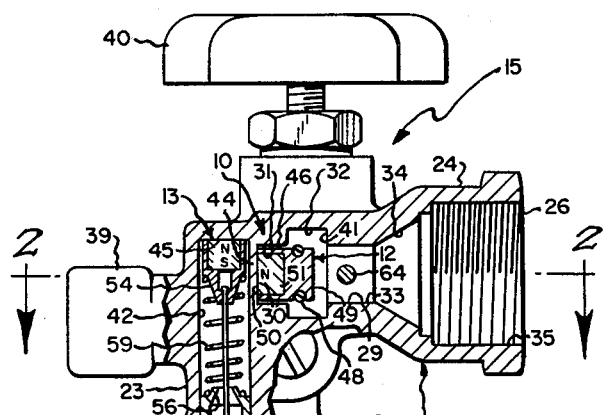
FIG. 4 is a fragmentary vertical sectional view similar to that of FIG. 1, but showing the improved valve in a flow-stopping condition.
Figure 4:
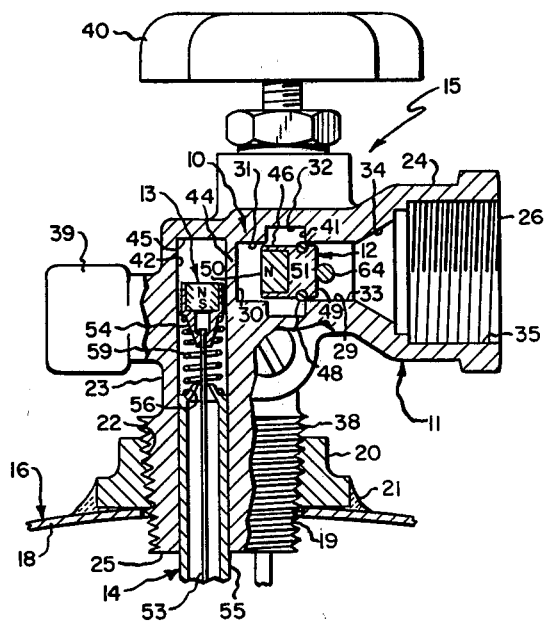

Referring now to FIGS. 2 and 3, the improved valve 10 may further include an override mechanism, generally indicated at 60, to forcibly hold the piston 12 away from seat 41. To this end, body 11 is provided with a transverse horizontal hole 61 which extends into the body and communicates with the upper passageway through cylinder surface 33. A cylindrical member 62 is rotatably mounted in hole 61, and has a fluid-tight sealed engagement therewith by virtue of O-Ring 63. A pin 64 extends into the upper passageway from an eccentric position of the members's inner end face 65. A handle 66 is arranged outside the body and is connected to member 62. Hence, an operator may grasp handle 66 and rotate it from the position shown in FIG. 2, 180 degrees counterclockwise to the position shown in FIG. 3. During such rotation, eccentric pin 64 will engage the piston right face 49 and displace the piston leftwardly, away from its sealed engagement with seat 41.

Operation

As previously indicated, the improved valve 10 operates independently of the gate valve, which continues to be the primary means of metering flow of fuel through the valve. In effect, the two valves are arranged in series in the flow passageway.

The improved valve 10 functions to indicate a low liquid fuel level within the tank, by interrupting the desired flow through the gate valve. Such interruption can be overcome by selective operation of the override mechanism 60, to permit consumption of the remaining fuel.

When the level of liquid fuel is sufficiently high, float 52 will cause magnet 13 to abut the terminal end 45 of hole 42. This represents a first flow-permitting position, at which the lower South pole of magnet 13 will be positioned proximate the piston's North pole through magnetically-permeable body wall 44. Being of opposite polarity, the piston will be moved leftwardly away from the seat, so as to permit normal flow through the upper passageway.

As the liquid level falls, float 52 and magnet 13 will move downwardly until ultimately the upper North pole of magnet 13 will be arranged proximate the piston's North pole. This represents a second flow-stopping position of magnet 13, at which the repulsive forces between the like poles will move the piston rightwardly until O-Ring 48 sealingly engages seat 41 to interrupt the desired flow. Such interruption indicates a low fuel condition.

Upon occurrence of this event, the operator may selectively operate the override mechanism 60 to forcibly displace the piston leftwardly away from the seat, against the repulsive forces between like magnetic poles. Such operation of the override mechanism will displace the piston to a flow-permitting position, thereby permitting consumption of the remaining fuel.

Scope of the Invention

While the presently preferred embodiment of valve 10 has been shown as incorporated into the body of a conventional gate or "cylinder" valve, it is contemplated that the invention has wider application apart from this particular environment. The body may be personal to the improved valve, or shared commonly with other structure. The valve body need not necessarily be entirely formed of a magnetically permeable material. However, the wall 44 should be. The valve element need not necessarily be in the form of a piston. While the actuator is shown as being responsive to variations in liquid level, the form of the actuator may be modified. Similarly, the parameter sensed need not only be liquid level. Other such parameters include, but are not limited to, pressure, temperature, and the like. If the sensed parameter was temperative, the actuator might be in the form of a bimetallic strip; if pressure, a bellows or diaphragm. Hence, the term "actuator" is intended generically and has a broad scope.

Therefore, while the presently preferred embodiment has been shown and described, and several modifications thereof discussed, persons skilled in this art will appreciate that various additional changes and modifications may be made without departing from the spirit of the invention, as defined by the following claims.

What is claimed is:

1. A valve adapted to be mounted on a cylinder containing a liquid and operable to prevent such liquid contents from being totally withdrawn from said cylinder, comprising:
- a body adapted to be mounted on said cylinder and having a passageway for permitting flow of gas therethrough and having a seat surrounding said passageway;
- an element mounted in said body for movement toward and away from said seat, said element having a portion thereof arranged to sealingly engage said seat when said element is moved selectively toward said seat and having a magnetic pole;
- a magnet mounted in said body for movement between a first position at which said element pole will be proximate the opposite pole of said magnet for causing said element to be moved away from said seat, and a second position at which said element pole will be proximate the like pole of said magnet for causing said element to be moved toward said seat;
- an actuator arranged to move said magnet in response to variation in the level of said liquid within said cylinder, said actuator including a float arranged to sense the level of said liquid, and a rod connecting said float and magnet, said magnet being mounted for movement within said body in a direction substantially perpendicular to the direction of movement of said element; and
- an override mechanism mounted on said body and selectively operable to displace said element away from said seat when said magnet is in said second position to permit flow of fluid through said passageway.

2. A valve as set forth in claim 1 wherein said body is formed of a magnetically permeable material.

3. A valve as set forth in claim 1 wherein said magnet is separated from said element by a wall of said body, and wherein said wall is formed of a magnetically permeable material.

4. A valve as set forth in claim 1 wherein said element includes a free sliding piston.

5. A valve as set forth in claim 4 wherein a magnet is mounted on said piston to provide said pole.

6. A valve as set forth in claim 1 wherein said override mechanism includes a member rotatably mounted on said body, and a pin eccentrically mounted on said member and selectively engageable with said element.

* * * * *